Patented Mar. 28, 1933

1,902,993

UNITED STATES PATENT OFFICE

WILLIAM L. ELLERBECK, OF SALT LAKE CITY, UTAH

METHOD OF FORMING CELLULAR PRODUCTS

No Drawing. Application filed May 5, 1930. Serial No. 450,066.

My invention relates to compositions, cementitious in character, which when admixed with water, are momentarily made fluid or plastic and which ultimately set through hydration or crystallization, and in connection or in relation with which compositions it is desirable to render them cellular or porous, in varying degree, according to the purpose for which the compositions are to be used.

My invention involves the employment or use of the perborates of various metallic substances, including either or all or any admixture of the perborates of the alkali metals, such as sodium, potassium and lithium, the alkali earth metals, such as calcium, magnesium, etc., the perborates of the so-called heavy metals and the perborate of ammonium, all of which substances in contact with water or moisture, emanate or evolve oxygen gas as one of the final or end reactions.

The function of the gas released is in varying degree, according to the amount of the various perborate salts used, to induce bubbles of gas, which during the set or crystallization of the various cementitious products, or any combination thereof, to a very great extent become enmeshed in the mass for a sufficient length of time to produce a permanent cellular structure, thus rendering the set product porous and less dense than would be the case without the addition of the chemicals or compounds noted. The physical characteristics thus induced make these cementitious products adaptable and useful for various purposes, chiefly structural, in connection with buildings where specifically light and porous pre-cast ornamentations, poured walls or partitions, or structural slabs or tile are either required or desired, or in respect to the use of so-called wall plaster over various bases, when applied in the plastic state, where a resultant light, porous sound-absorptive product is an objective, as under the accepted term of "acoustic plaster."

While not limiting my invention to any one class of cementitious material, it is particularly adapted for accomplishing the purposes mentioned in connection with various gypsum products, such as partially calcined gypsum, sometimes referred to as stucco, or, when variously treated in gypsum mill practice chemically or physically, either or both, as plaster of Paris or as hardwall plaster, finishing plaster, ornamental (so-called casting) plaster, wall-board plaster, block plaster, etc., and either with or without inclusions of aggregates or fillers, or of color elements, either or all, and whether organic or mineral in nature, or in connection with so-called dead-burned gypsum or in connection with Keen's cement, all essentially gypsum products, and with or without inclusions of aggregates or color elements, either or both.

While not limiting my invention in respect to the proportions or inclusions of these various perborate salts, I have found that the degree or extent of cellurization and size of pores and the relative ultimate density of the cementitious material is in a large degree proportional to the amount of the salts included. The proportion may therefore, be modified accordingly, depending on the purity of the salts and the purposes to which the various products are to be put.

It is well known that there are various other mineral chemicals and mixtures of mineral chemicals which have been utilized in rendering porous various cementitious materials, but which, particularly in connection with gypsum plasters, tend to hasten the set or crystallization and which acceleration may be and frequently is a decided disadvantage. There has, heretofore, been no mention or known use of the perborate salts for cellulation of cementitious products or for retarding the set or crystallization thereof. The inclusion of perborates is of very great advantage in many of the cementitious plastics, where the time factor required for perfect preparation of cast specimens or application in a plastic form on wall surfaces, in a layer or layers, may be and frequently is highly desirable and a great improvement on other cell or pore producing chemicals heretofore employed. Other mineral chemicals tend to hasten the set and to offset or counteract which extraordinary amounts of nitrogenous or other organic retarding elements may be and frequently are required, the expense incident thereto being relatively great, and which practice frequently results in lessening of the strength and general structural value determinable under the usual resistance tests prescribed by the American Society for Testing Materials.

The use of the perborate salts cuts down the use of expensive retarding elements normally employed, presenting therefore, a distinct commercial advantage, and at all times with less impairment of physical strength than in those cases where large or excessive inclusions of other retarding elements are made necessary, or used, to retard the set.

While perborates vary somewhat in chemical formulæ, according to the valence of the base element in combination and the number of molecules of water of crystallization or combination, such as in the following partial list, 1. Calcium perborate=$Ca(BO_3)_2$ plus $7H_2O$.
2. Magnesium perborate=$Mg(BO_3)_2$ plus $7H_2O$.
3. Sodium perborate=$NaBO_3$ plus $4H_2O$, the addition of water, $H_2O$, in all cases results in the disassociation of the perborate ($R_xBO_3$) to the metaborate ($R_xBO_2$) plus hydrogen peroxide or hydrogen dioxide ($H_2O_2$), the latter unstable compound disassociating into water ($H_2O$) and oxygen (O) gas. As a result of these reactions the gaseous evolution or ebullition above referred to, is occasioned.

Having thus described my invention I desire to secure by Letters Patent and claim:—

1. A method of producing cellular gypsum comprising the addition of perborate salts and water to the gypsum to produce a cellular slow crystallization product.

2. A method of producing cellular cementitious products comprising the addition of perborate salts to partially calcined gypsum and mixing with water to retard the set of the mixture and make the resulting product cellulate.

In testimony whereof I have affixed my signature.

WILLIAM L. ELLERBECK.